M. B. CUNNINGHAM.
VENTILATING DEVICE.
APPLICATION FILED OCT. 6, 1910.
985,730.
Patented Feb. 28, 1911.
2 SHEETS—SHEET 1.
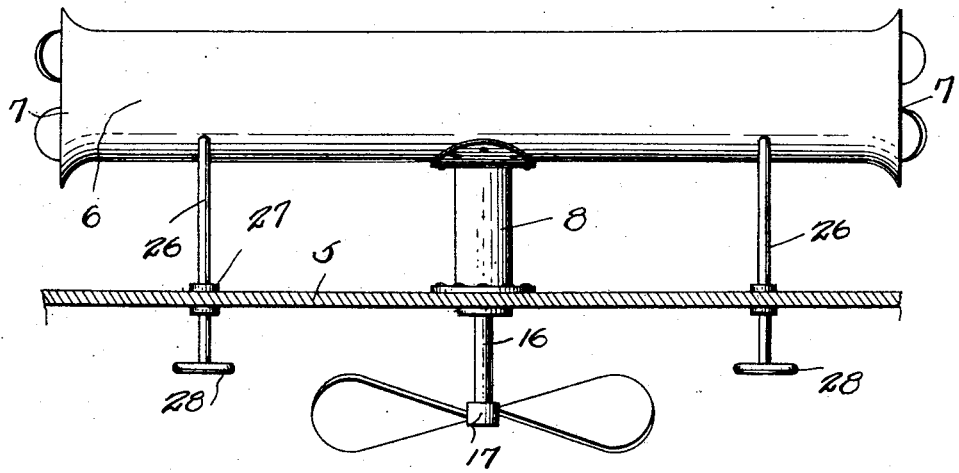
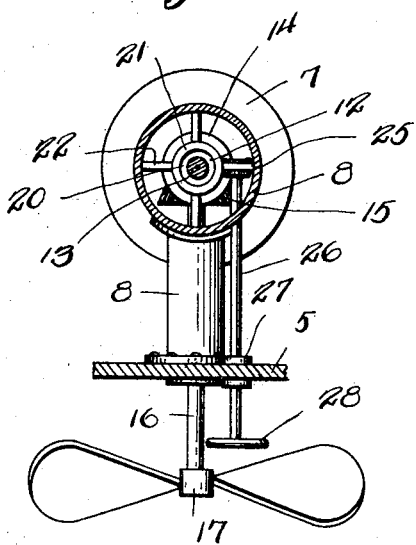
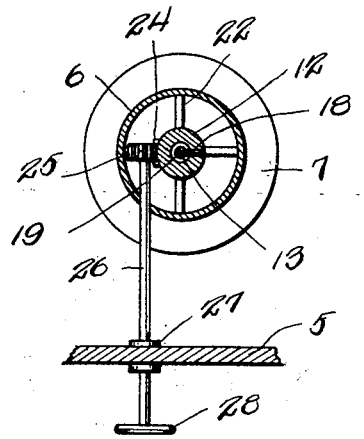
Witnesses
C. C. Richardson
Inventor
Melville B. Cunningham,
By Victor J. Evans
Attorney

M. B. CUNNINGHAM.
VENTILATING DEVICE.
APPLICATION FILED OCT. 6, 1910.

985,730.

Patented Feb. 28, 1911.

2 SHEETS—SHEET 2.

Witnesses
C. C. Richardson

Inventor
Melville B. Cunningham
By Victor J. Evans
Attorney

UNITED STATES PATENT OFFICE.

MELVILLE BOYD CUNNINGHAM, OF FORT WORTH, TEXAS.

VENTILATING DEVICE.

985,730.      Specification of Letters Patent.      Patented Feb. 28, 1911.

Application filed October 6, 1910. Serial No. 585,656.

*To all whom it may concern:*

Be it known that I, MELVILLE B. CUNNINGHAM, a citizen of the United States, residing at Fort Worth, in the county of Tarrant and State of Texas, have invented new and useful Improvements in Ventilating Devices, of which the following is a specification.

The invention relates to a ventilating device, and more particularly to the class of ventilating fans for houses, cars, vehicles or the like.

The primary object of the invention is the provision of a ventilating device in which air will be conveyed to the interior of a car, vehicle or the like upon the travel thereof in either direction, the fans being automatically operated by the air currents while the car or the like is in motion.

Another object of the invention is the provision of a ventilating device in which rotary fans are so arranged within a draft tube adapted to be mounted exteriorly of a car, vehicle or the like, that on the travel of the same, in one direction or the other, either of the fans will be operated whereby the ventilating mechanism within the car, vehicle or the like will be driven for creating cool air circulation therein.

A further object of the invention is the provision of a ventilating device in which the driving propellers or fans may be locked against rotation independently of each other thereby enabling but one fan or propeller to operate when a car or other vehicle is traveling in one direction so that on the travel of the car in either direction a thorough circulation of air will be had therein.

With these and other objects in view, the invention consists in the construction, combination and arrangement of parts, as will be hereinafter more fully described, illustrated in the accompanying drawings, and pointed out in the claims hereunto appended.

Figure 4:
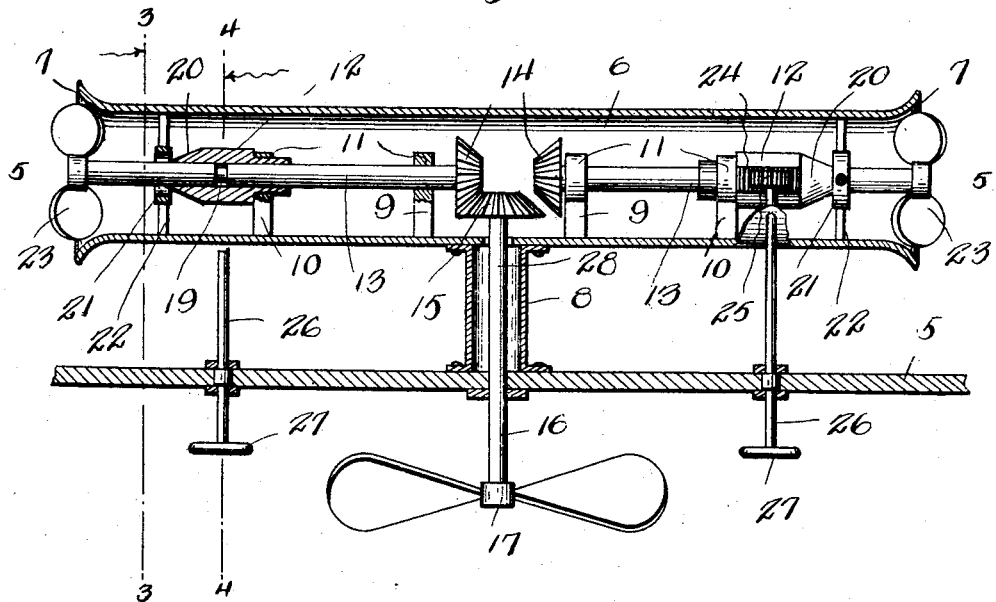
Figure 5:
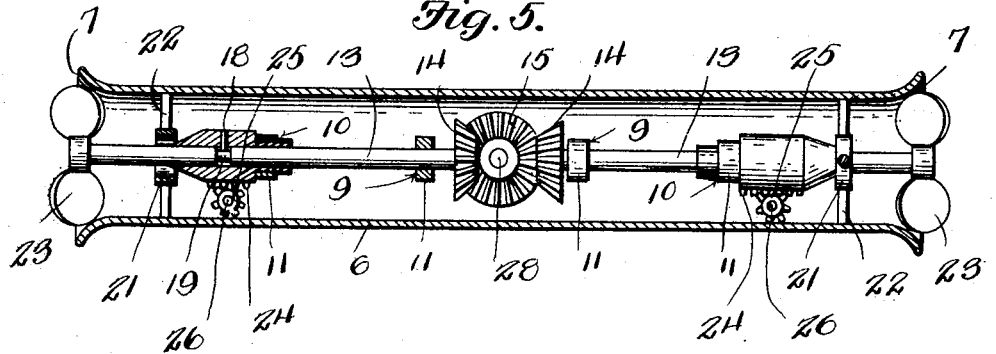

In the drawings:—Figure 1 is a fragmentary vertical longitudinal sectional view of a railway car with the ventilating device mounted therein constructed in accordance with the invention. Fig. 2 is a vertical longitudinal sectional view through the ventilating device and portion of the car. Fig. 3 is a sectional view on the line 3—3 of Fig. 2. Fig. 4 is a sectional view on the line 4—4 of Fig. 2. Fig. 5 is a sectional view on the line 5—5 of Fig. 1.

Similar reference characters indicate corresponding parts throughout the several views of the drawings.

Referring to the drawings by numerals, 5 designates a portion of the roof of any ordinary well known railway car above which is mounted a wind cowl comprising a tubular body 6, the latter being of any desirable length and having oppositely flared mouth end portions 7, the tube section 6 being supported upon a hollow post or standard 8, the latter being secured centrally to the said tube and also secured to the roof 5 of the car in any suitable manner.

Within the tube section 6 are suitably secured inner and outer brackets 9 and 10, each being provided with a bearing 11, which bearings are arranged in alinement with each other centrally of the tube section. The bearings 11 of the outer bracket 10 have slidably fitted therein shiftable sleeves or boxings 12 and journaled in these boxings 12 and the bearings 11 of the inner bracket 9 are rotatable shafts 13, the inner ends of which have fixed thereto beveled pinions 14, the same meshing with a beveled gear 15 at diametrically opposite points thereof, the gear 15 being fixed to the upper end of a rotatable fan shaft 16, the latter passed vertically through the hollow post or standard 8, and has fixed to its inner end a bladed wheel 17 forming a fan which latter is located within the car for ventilating purposes.

Each boxing 12 has threaded thereon a key or pin 18, the latter engaging in an annular groove 19 formed in the shaft 13 so that the said boxing 12 will be held against longitudinal displacement upon the said shaft yet permitting the latter to rotate thereon. The said boxings 12 are suitably splined in the bearings 11 on the outer bracket 10, whereby the said boxings will be free to slide in the bearings but prevented from rotation therein. The outer end of the boxings 12 are contacted for the tapered extremities 20, which latter are adapted to be wedged in central eyes 21 of a spider 22 secured to the tube section 6 on the disengagement of the pinions 14 from the gear 15 when the said boxings have been shifted in a manner as will be hereinafter fully described.

Secured to the outer ends of the shaft 13 are propeller blades 23 which receive impact from the air currents passing through the wind cowl during the advancement of the car. On the rotation of the shafts 13 when the pinions 14 are meshing with the gear 9, a similar movement will be imparted to the shaft 16 thereby rotating the fan 17 within the body of the car for the circulation of cool air therein.

Formed exteriorly on the slidable boxings 12 are rack teeth 24 each being engaged by a rack gear 25, the latter fixed to a turning shaft 26 rotatably mounted in suitable bearings 27, the turning shaft 26 being extended within the car, and has fixed to its opposite end a turning wheel 28, whereby said shaft will be rotated for operating the rack gear 25 which in turn will shift the slidable boxing 12, and on the movement of the latter in one direction it disengages the pinion 14 from the gear 15 thus interrupting the transmission of rotary motion from the shaft 13 to the shaft 28 of the fan. On moving the boxing 12 in a direction for disengaging the pinion 14 from the gear 15, the outer tapered end 20 of the said boxing is simultaneously brought into engagement with the eye 22 of the spider member, thus sustaining the shaft 13 in its shifted position so as to retain the pinion 14 out of mesh with the gear 15 and thereby interrupting motion from the shaft 13 to the shaft 28 of the fan.

It is, of course, to be understood that the shaft in the end of the cowl is directed in the direction of travel of the car and is mounted so that the pinion 14 will mesh with the gear 15, whereby air passing through the cowl will impact against the blades 23 causing the shaft 13 to rotate and be meshing with the pinion 14 and the gear 15, whereby motion from the said shaft 13 will be imparted to the shaft 28 for motion of the fans. This fan while rotating will cause a circulation of air within the body of the car for ventilation thereof during the travel of the same.

Having thus described the invention what I claim as new is:—

1. In a ventilator, a cowl, rotatable shafts journaled thereon, bladed wheels fixed to the outer ends of said shafts, a fan shaft disposed at right angles to said first named shafts, a fan on the fan shaft, gear connections between the shafts, and means for moving each of the first named shafts for disengagement with the last named shaft.

2. In a ventilator of the class described, a cowl, independently rotatable shafts arranged within, propeller wheels carried thereby, a fan operated by the said shafts, and means for moving each shaft to inoperative position.

3. In a ventilator of the class described, independently rotatable shafts arranged therein, propeller wheels carried by the shafts, a fan shaft, gear connection between the first named shafts and the said fan shaft, and means for disengaging the gear connection between the said shafts.

In testimony whereof I affix my signature in presence of two witnesses.

MELVILLE BOYD CUNNINGHAM.

Witnesses:
C. J. HENDRICKS,
JAS. E. MERCER.

---

Copies of this patent may be obtained for five cents each, by addressing the "Commissioner of Patents, Washington, D. C."